United States Patent
Keranen et al.

(10) Patent No.: US 7,549,211 B1
(45) Date of Patent: Jun. 23, 2009

(54) METHOD FOR DE-TABBING A DISK DRIVE HEAD SUSPENSION FLEXURE

(75) Inventors: Lucas P. Keranen, Hutchinson, MN (US); Hryhory T. Koba, Hutchinson, MN (US); Raymond A. Loehlein, Minneapolis, MN (US); Patrick E. Madsen, Litchfield, MN (US); Arun S. Kumar, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 421 days.

(21) Appl. No.: 11/427,842

(22) Filed: Jun. 30, 2006

(51) Int. Cl.
*G11B 5/127* (2006.01)
*H04R 31/00* (2006.01)

(52) U.S. Cl. .............. 29/603.06; 29/603.03; 29/603.07; 205/119; 205/122; 216/39; 216/65; 360/234.5; 360/244.2; 360/244.8; 360/245.2; 360/245.4

(58) Field of Classification Search .............. 29/603.03, 29/603.04, 603.07; 205/119, 122; 257/778, 257/783; 216/39, 65; 360/234.5, 244.2, 360/244.8, 245.2, 245.4, 294.4–294.7
See application file for complete search history.

(56) References Cited

U.S. PATENT DOCUMENTS

| | | | |
|---|---|---|---|
| 4,671,848 A | 6/1987 | Miller et al. | |
| 5,832,763 A * | 11/1998 | Girard | 72/16.3 |
| 5,832,764 A * | 11/1998 | Girard | 72/16.3 |
| 5,959,807 A | 9/1999 | Jurgenson | |
| 6,288,876 B1 | 9/2001 | Albrecht et al. | |
| 6,348,661 B1 * | 2/2002 | Coon | 174/254 |
| 6,477,014 B1 | 11/2002 | Erpelding | |
| 7,275,408 B1 * | 10/2007 | Balasubramaniam et al. | 72/342.1 |
| 2002/0170892 A1 | 11/2002 | Lee et al. | |
| 2004/0016277 A1 * | 1/2004 | Thaveeprungsriporn | 72/31.1 |

FOREIGN PATENT DOCUMENTS

| | | |
|---|---|---|
| JP | 2000202385 | 7/2000 |
| JP | 2000288496 | 10/2000 |
| WO | WO 91/01514 | 7/1990 |

OTHER PUBLICATIONS

Keranen, Co-pending U.S. Appl. No. 10/687,158, Method of Laser Cleaning Surfaces on a Head Suspension, Filed Oct. 16, 2003, 17 pp.
Walters et al., Summary Report on "Advanced Technology Cleaning Methods for High-Precision Cleaning of Guidance System Components," Sep. 3, 1993, 53 pp., The Aerospace Guidance and Metrology Center, Newark Air force Base, OH.

* cited by examiner

*Primary Examiner*—Paul D Kim
(74) *Attorney, Agent, or Firm*—Faegre & Benson LLP

(57) ABSTRACT

A method for de-tabbing a dielectric tab extending between and bonded to first and second stainless steel portions of a disk drive head suspension component. Exemplary first and second stainless steel portions are a flexure base region and a flexure tongue. The method includes applying laser energy to the dielectric tab. The laser energy is characterized by one or more parameters, e.g., a pulse width and/or an energy density, causing de-bonding of the dielectric tab from the first and second stainless steel portions.

9 Claims, 5 Drawing Sheets

METHOD FOR DE-TABBING A DISK DRIVE HEAD SUSPENSION FLEXURE

FIELD OF THE INVENTION

The present invention relates generally to methods for fabricating disk drive head suspension components. In particular, the present invention is to a method of delaminating dielectric and stainless steel or conductor layers in an integrated lead or wireless flexure.

BACKGROUND OF THE INVENTION

Wireless or integrated lead flexures for magnetic disk drive suspension assemblies are known. Conventional wireless flexures are mounted to a load beam and include a plurality of leads and a structure (e.g., a tongue having a slider receiving surface) to which a head slider is mounted. The head slider is an electronic component including a magnetic read/write transducer which can read and/or write data from/to the magnetic disk. The head slider is supported and properly oriented in relationship to the magnetic disk of the disk drive by the suspension assembly. As the disk rotates beneath the head slider and head suspension, the air above the disk similarly rotates, thus creating an air bearing which acts with an aerodynamic design of the head slider to create a lift force on the head slider. The lift force is counteracted by the head suspension. The flexure tongue, to which the head slider is attached, is designed to be flexible and resiliently moveable with respect to the remainder of the flexure in response to the aerodynamic forces generated by the air bearing.

Conventional integrated lead flexures are multi-layer structures including a stainless steel layer, a conductor layer including a plurality of integrated leads in the form of conductive metal traces, and a dielectric insulating layer between the stainless steel and conductor layers. Such flexures are typically mass produced by forming a plurality of flexures in an array on a frame or sheet, using multi-step fabrication processes. For example, integrated lead flexures can be fabricated from a laminate sheet including stainless steel, dielectric, and conductive metal (e.g., copper) layers subjected to multiple etching steps using known photolithographic techniques. Alternatively, integrated lead flexures can be formed using additive processes, whereby the stainless steel layer is initially formed (e.g., by etching a stainless steel sheet), and the dielectric and conductor layers are subsequently deposited onto the flexure structure.

Portions of such flexures (e.g., the flexure tongue) desirably have a low stiffness, and thus, are temporarily supported and stiffened, e.g., via temporary structures, sometimes known as tabs, during the multi-step fabrication process. Where used, such temporary structures must be removed from the final production flexure components. Known processes for removing these components, or de-tabbing the flexures, include physically removing the tabs by mechanical means (e.g., cutting). Such processes can sometimes damage the flexures and can also leave residual tab material of the flexure.

There remains a continuing need for improved de-tabbing processes. In particular, there is a need for a process for effectively de-tabbing disk drive head suspension flexures without applying physical force to de-tab the flexure stainless steel and/or conductor structures, and which provide flexures having minimal residual tab material.

SUMMARY OF THE INVENTION

The present invention is a method for delaminating a selected region of a disk drive head suspension flexure. In one embodiment, the flexure includes a stainless steel layer and a dielectric layer bonded to the stainless steel layer. The method comprises, in one embodiment, applying laser energy to the selected region of the flexure, the laser energy being characterized by one or more parameters causing de-bonding of the dielectric layer from the stainless steel layer.

DETAILED DESCRIPTION OF THE PREFERRED EMBODIMENTS

Figure 1:
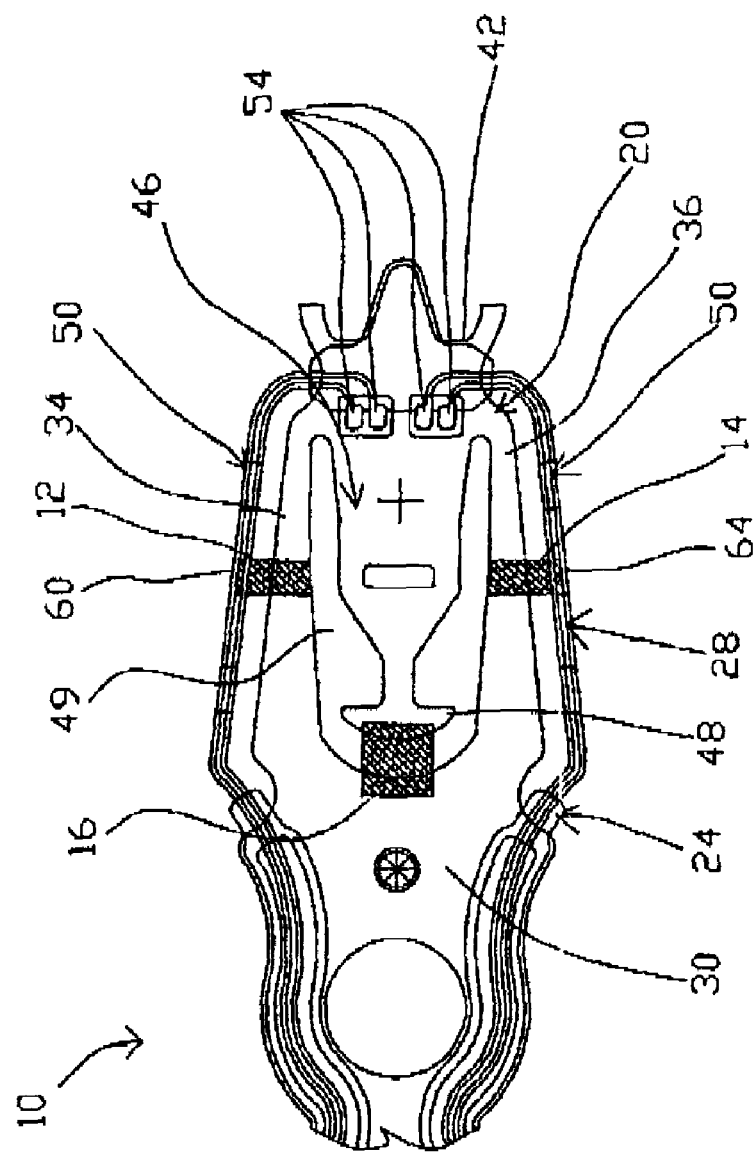
FIG. 1 is a plan view of a portion of a disk drive head suspension flexure including temporary dielectric support tabs.

FIG. 1 illustrates a distal portion of a disk drive head suspension flexure 10 that can be processed in accordance with the various embodiments of the present invention. The flexure 10 is shown in FIG. 1 in an intermediate fabrication state and includes temporary dielectric tabs 12, 14, 16 for stiffening and supporting portions of the flexure 10 during fabrication. The tabs 12, 14, and/or 16 can be removed during the final stages of fabrication, so that the tabs are not present in the final production flexure 10. As described in detail below, the present invention provides methods for de-tabbing the flexure 10 by applying laser energy to selected regions of the flexure 10 in which the dielectric tabs 12, 14, 16 are located. The terms "de-tab," "de-tabbed," de-tabbing," and variations thereof shall refer to the delamination of support and stiffening tabs, for example, the dielectric tabs 12, 14, 16 of the flexure 10, and the stainless steel and/or conductor layers/structures to which they are bonded.

As shown in FIG. 1, the flexure 10 has a multi-layer structure and includes a stainless steel layer 20, a dielectric insulating layer 24, and a conductor layer 28. The conductor layer 28 is generally bonded to the dielectric layer 24. Additionally, the portions of the dielectric layer 24 overlaying the stainless steel layer 20 are bonded thereto.

The dielectric layer 24 electrically insulates the conductor layer 28 from the stainless steel layer 20. The dielectric layer 24 can be made from any dielectric material known or later developed which is suitable for use in magnetic disk drive head suspension flexures. A well-known dielectric material for such applications is polyimide, although it is emphasized that any suitable dielectric material can be used. Similarly, the conductor layer 28 can be made from any material having suitable electrical conductivity. Commonly used conductor materials for wireless flexure leads such as the flexure 10 include copper and copper alloys.

In the illustrated embodiment of FIG. 1, the stainless steel layer 20 includes a base region 30, a pair of flexure arms 34, 36, a cross member 42, and a flexure tongue 46. The flexure arms 34, 36 extend distally from the base region 30, and the cross member 42 extends between the flexure arms 34, 36 at or near the distal end of the flexure 10. The tongue 46 extends proximally from the cross member 42, and includes a proximal end portion 48 (which in the illustrated embodiment is formed into a limiter tab for limiting deflection of the tongue 46 under load). As shown, a gap 49 separates the flexure tongue 46 from the flexure base region 30 and the flexure arms 34, 36.

As further shown in FIG. 1, the conductor layer 28 includes a plurality of integrated leads 50 terminating in lead contact pads 54 located generally adjacent to the distal end of the flexure tongue 46. In the illustrated embodiment, the leads 50 include lateral portions 60, 64 located partially outside the flexure arms 34, 36, with the distal most portions of the leads 50 supported by the cross member 42. As will be appreciated, the lead contact pads 54 are configured to be electrically coupled to terminal pads of a head slider (not shown) mounted to the flexure tongue 46, and the leads 50 electrically connect the head slider to other electrical components of the magnetic disk drive.

As shown, the dielectric layer 24 is located between portions of the leads 50 that overlay the stainless steel layer 20. In some embodiments (not shown), the dielectric layer can include lateral dielectric members for supporting the lateral portions 60, 64 of the leads 50. In other embodiments (not shown), the lateral portions 60, 64 of the leads 50 are positioned between the flexure arms 34, 36 and the flexure tongue 46.

As also illustrated in FIG. 1, the dielectric layer 24 further includes the tabs 12, 14 and 16. As shown, the tabs 12, 14 extend between and connect the flexure arms 34, 36 to the lateral lead portions 60, 64, thereby supporting those portions of the leads 50. Additionally, the tab 16 extends between and connects the flexure base region 30 and the proximal end portion 48 of the flexure tongue 46. The tab 16 supports and stiffens the flexure tongue 46 during later fabrication steps, which is particularly advantageous in flexure designs having low-stiffness tongues. In other embodiments (not shown), the tabs 12, 14, and/or 16 could be at other locations. Additionally, in other embodiments (not shown) not all of the tabs 12, 14, and 16 are included. For example, in one embodiment, only the tab 16 supporting the flexure tonge 46 may be included. Alternatively, in another embodiment, only the tab 12 and/or 14 for supporting respective lateral lead portion(s) may be included.

The flexure 10 can be fabricated using any known method. For example, the flexure 10 can be formed from a multi-layer laminate sheet including the stainless steel, dielectric, and conductor layers. In one embodiment, the flexure 10 is formed from a stainless steel, polyimide, and copper laminate sheet using known photolithography techniques. In one such technique, the structures of the stainless steel and dielectric layers (including the tabs 12, 14, and/or 16) are etched from the laminate sheet, and the conductive traces of the leads 50 are then formed by subsequent etching processes. The tabs 12, 14, 16 thus advantageously stiffen and support portions of the flexure 10 (e.g., the flexure tongue 46 via the tab 16) during trace formation and other fabrication and assembly processes.

As noted above, the tabs 12, 14, 16 are removed from the final production flexure 10. The flexure 10 can be de-tabbed by the application of laser energy to selected regions of the flexure 10 containing the tabs 12, 14, 16, according to various embodiments of the present invention. As discussed in detail below, the parameters of the laser energy for de-tabbing the flexure 10 are selected so as to cause delamination of the dielectric and stainless steel layers within the selected regions. Additionally, the laser energy parameters are further selected to cause this delamination without causing visible discoloration or warping of the stainless steel and/or conductor layers due to overheating these layers or the dielectric material.

Figure 2:
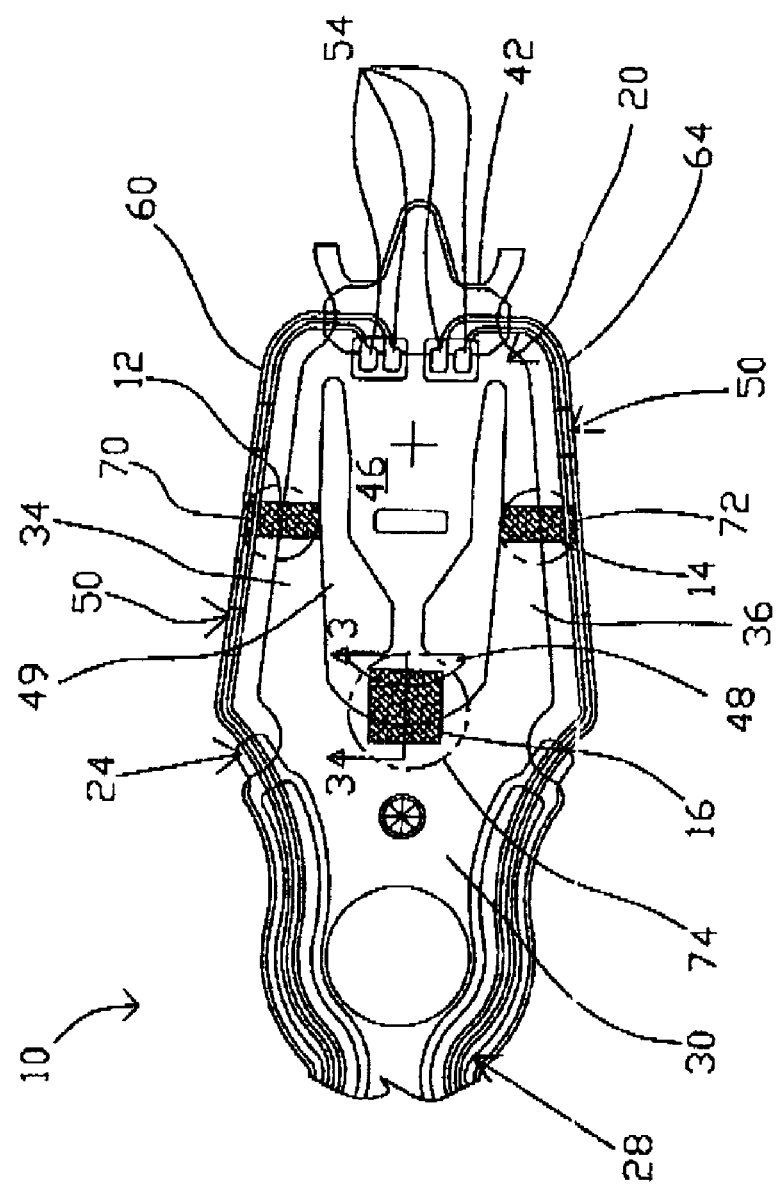
FIG. 2 is a plan view of the flexure of FIG. 1 showing selected regions for application of laser energy for de-tabbing the flexure according to various embodiments of the present invention.

FIG. 2 illustrates the flexure 10 including selected regions 70, 72, and 74 (as indicated by dashed lines) to which laser energy is applied for de-tabbing the flexure 10 according to one embodiment of the present invention. As shown in FIG. 2, the locations of the selected regions 70, 72, and 74 correspond to the locations of the tabs 12, 14, and 16, respectively. In the embodiment shown in FIG. 2, the selected regions 70, 72, 74 are sized such that each tab 12, 14, 16 fits entirely within the respective region. Thus, by applying the laser energy to the entire extent of the selected regions 70, 72, and 74, delamination of the dielectric tabs 12, 14, 16 and the respective stainless steel structures (e.g., the tab 16 and the flexure base region 30 and flexure tongue proximal end portion 48) can be ensured. In other embodiments (not shown), the selected regions are sized and located so as to extend only over the areas in which the dielectric support tab(s) are bonded to the stainless steel layer. In some embodiments, the sizes of the selected areas 70, 72 and/or 74 are determined by the spot size of the applied laser energy pulse. The laser spot size can be controlled by any known methods and devices.

It is emphasized that the area of delamination of the stainless steel and dielectric layers is substantially confined to the selected regions to which the laser energy is applied. Thus, to ensure complete delamination of the dielectric tab and corresponding stainless steel layer, the laser energy is applied to the entire region of the flexure in which the tab and the stainless layer are bonded together. In addition, by appropriately controlling the sizes and locations of the selected regions 70, 72, 74 to which the laser energy is applied, the tabs 12, 14 and 16 can be effectively de-bonded from the corresponding stainless steel structures without delaminating other regions of the flexure 10.

In some embodiments, a single pulse of laser energy is effective to delaminate the dielectric tab and the corresponding stainless steel layer. In other embodiments, multiple pulses can be applied.

Figure 3:
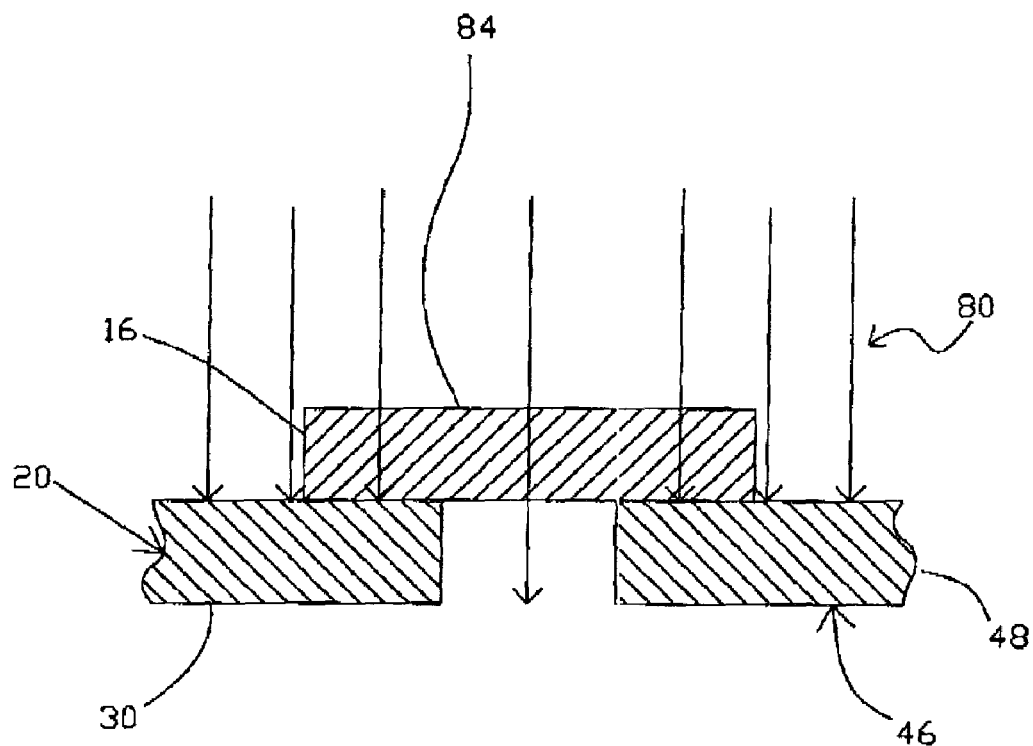
FIG. 3 is a cross-sectional view of a portion of the flexure of FIG. 1.

FIG. 3 is a cross-sectional view of a portion of the flexure 10 showing the dielectric tab 16 bonded to the flexure base region 30 and the proximal end portion 48 of the tongue 46 with laser energy 80 impinging thereon. As shown, the dielectric tab 16 includes an exposed surface 84 opposite the stainless steel layer 20, and the laser energy is directed at the exposed surface 84. As will be appreciated, the dielectric tab 16 is substantially transparent to the laser energy. Thus, substantially all of the laser energy impinges on the stainless steel flexure base region 30 at the interface of the dielectric tab 16 and the stainless steel structures, thus maximizing the laser energy available for de-bonding the dielectric and stainless steel structures. Accordingly, the laser de-tabbing methods of the present invention are particularly effective where the laser energy is applied as shown in FIG. 3, that is, to the exposed surface 84 of the dielectric tab 16 and toward the stainless steel base region 30 and flexure tongue 46.

Delamination of the dielectric and stainless steel layers according to the methods of the present invention may result from sudden heating and/or vaporization at the dielectric/ stainless steel interface within the selected region to which the laser energy is applied. This sudden heating may create a corresponding increase in vapor pressure at this interface. This vapor pressure spike may effectively generate a shock wave causing de-bonding of the stainless steel and dielectric layers within the selected region, and in some circumstances, causing displacement of the dielectric material from the stainless steel layer. This shock-wave effect is believed to increase as the rate at which the laser energy is delivered to the selected region increases.

Alternatively, or additionally, the application of laser energy to the stainless steel/dielectric structures according to the present invention may cause de-bonding of the stainless steel and dielectric layers due to the difference in thermal expansion coefficients of the two materials. Thus, as the layers are heated by the impinging and reflected laser energy within the selected region, the layers will expand at different rates, effectively shearing the stainless steel/dielectric bond at the interface between the layers. This differential thermal expansion effect is believed to increase as the rate at which the laser energy is delivered to the selected region increases.

In accordance with the present invention, parameters of the laser energy, in particular, pulse width, and/or energy density of the laser energy, are selected so as to de-bond the dielectric and stainless steel layers. In addition, it is also desirable to select laser energy parameters suitable for delaminating the stainless steel and dielectric layers without causing visible signs of excessive heating (e.g., warping of the stainless steel layer and/or discoloration of the stainless steel layer caused by burning of the dielectric material prior to delamination).

In one embodiment, the laser energy for de-tabbing the stainless steel structures of the flexure 10 is characterized by a pulse width of from about 6 ns to about 2 ms. In one preferred embodiment, the pulse width is from about 6 ns to about 10 ns. In one particularly preferred embodiment, the pulse width is about 6 ns.

Alternatively, or additionally, the applied laser energy can have an energy density of from about 0.55 J/cm2 to about 1.75 J/cm2. In one preferred embodiment, the energy density is from about 0.57 J/cm2 to about 0.74 J/cm2. In one particularly preferred embodiment, the energy density is about 0.59 J/cm2.

Any laser capable of generating laser energy having the desired characteristics as described above can be used to de-tab the flexure 10 according to the present invention. In one exemplary embodiment, the applied laser energy is generated using a q-switched Nd:YAG laser. The principles of operation of such lasers are known, and need not be described further here. In one such embodiment, the laser energy for de-tabbing the flexure 10 has a spot size of about 2.5 mm, a pulse width of about 10 ns, and an energy density of about 0.59 J/cm2. In another embodiment, a q-switched laser is utilized to generate laser energy having a wavelength of 532 nm and an energy density within the ranges specified above. In other embodiments, other types of lasers having wavelengths ranging from about 248 nm to about 1064 nm, for example, 355 nm q-switched lasers, and fiber lasers, can be utilized. In short, any wavelength laser energy can be utilized, so long as the dielectric layer is sufficiently transparent to the particular wavelength selected.

In some embodiments, particularly where relatively short pulse width (e.g., about 10 ns) laser energy is applied, the dielectric tab (e.g., the tab 16) may actually be physically removed from the flexure 10 upon the application of the laser energy (e.g., due to the shock wave effect described above). In other embodiments, the dielectric tab may remain in substantially the same position after delamination, but can be easily removed because the tab 16 is no longer bonded to the underlying stainless steel structures.

It is believed that the laser de-tabbing methods of the present invention can effectively de-tab any stainless steel flexure structures to which a dielectric tab is bonded. That is, the effectiveness of the methods of the present invention is believed to be substantially independent of the specific types and thicknesses of the stainless steel and dielectric materials. In one exemplary embodiment, the stainless steel layer 20 is about 18 micrometers thick, and the dielectric tabs 12, 14, and 16 are about 10 to about 18 micrometers thick. It is emphasized, however, that the foregoing thicknesses are exemplary only. Furthermore, as mentioned above, a common dielectric material for use in the dielectric layer 24, and accordingly, the dielectric tabs 12, 14, 16, is polyimide. However, any dielectric material suitable for use as an electrical insulating material in integrated lead flexures can be de-bonded from the underlying stainless steel structures using applied laser energy according to the present invention. That is, laser delamination of any dielectric laminate flexure structure can be accomplished according to the present invention where the dielectric is sufficiently transparent to the particular laser wavelength.

In the flexure embodiment illustrated in FIG. 2, complete removal of the tabs 12 and 14 may require additional (e.g., physical) steps where the laser energy is applied from the direction as indicated in FIG. 3. As can perhaps be best seen in FIG. 2, applying laser energy to the tabs 12, 14 in this manner will cause the laser energy to first impinge on the copper lead portions 60, 64 to which the tabs 12, 14 are bonded. In that case, much of the laser energy impinging on the copper lead portions 60, 64 will be reflected due to the high reflectivity of copper. Thus, a relatively small portion of the laser energy will penetrate the copper lead portions 60, 64 and reach the dielectric/copper interface. As a result, delamination of the copper and dielectric layers might not occur. In such cases, the tabs 12, 14 can be physically separated from the copper lead portions 60, 64 using known methods (e.g., cutting).

In other embodiments, however, with appropriately selected laser wavelengths, the copper lead portions 60, 64 can be laser de-tabbed. Thus, in one embodiment, the dielectric and copper layers 24, 28 can be delaminated by applying, for example, 532 nm q-switched laser energy to the dielectric/copper laminate in the manner described above with respect to the stainless steel and dielectric layers 20, 24. In another embodiment, a 1064 nm q-switched laser is used. In both embodiments, the pulse width and/or energy density of the applied laser energy falls generally within the ranges described above for delaminating dielectric and stainless steel layers.

Figure 4:
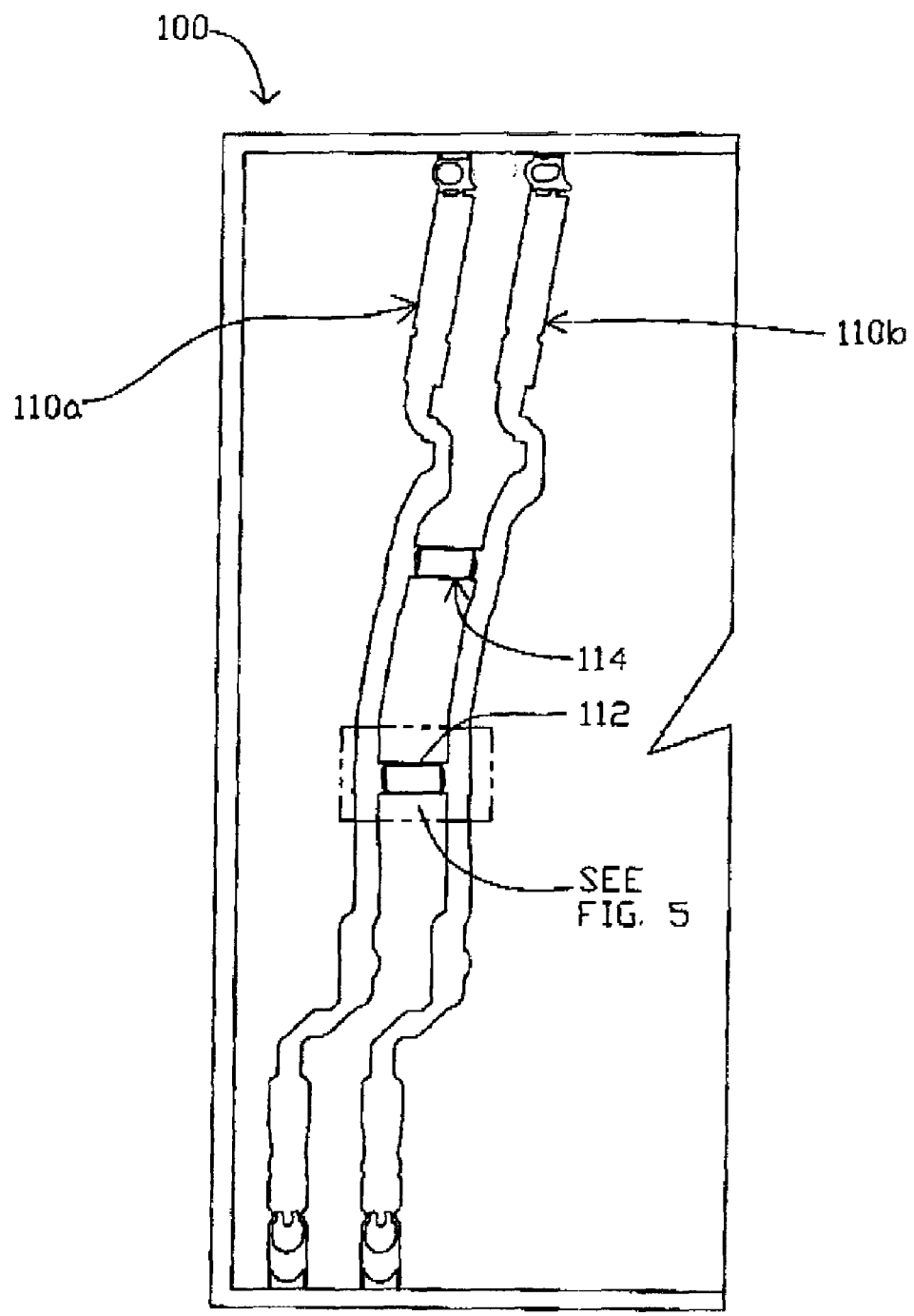
FIG. 4 is a partial plan view of a portion of a frame including an array of flexures which can be de-tabbed according to another embodiment of the present invention.

FIG. 4 is a partial plan view of a portion of a frame 100 including an array of flexures 110a, 110b (shown schematically) which can be de-tabbed according to another embodiment of the present invention. Although the details of the flexures 110a, 110b are not shown in the schematic view of FIG. 4, it will be appreciated that the flexures 110a, 110b can be of substantially the same or identical design as the flexure 10 described above. For example, in one embodiment, the flexures 110a, 110b can include stainless steel, dielectric, and conductor layers similar or identical to the corresponding layers in the flexure 10 described above. The array, including the flexures 110a, 110b, can be formed by etching a laminated sheet including stainless steel, dielectric (e.g., polyimide) and conductor (e.g., copper) layers. It will also be appreciated that although two flexures 110a, 110b are shown in the partial schematic view of FIG. 4, similar arrays can include more than two flexures.

As shown in FIG. 4, the flexures 110a and 110b are connected to each other at spaced locations (in the illustrated embodiment, two locations) along their lengths by tabs 112, 114. The tabs 112, 114 can be formed in the same manner (e.g., by etching the laminated sheet) as the major stainless steel and dielectric layers of the flexures 110a, 110b. Connecting the flexures 110a, 110b using the tabs 112 and 114 advantageously stiffens and supports the flexures within the array during fabrication (e.g., etching or otherwise forming the electrical traces of the leads). Accordingly, the tabs 112 and 114 can be removed prior to completion of the production flexures by selective application of laser energy according to the laser de-tabbing methods of the present invention.

Figure 5:
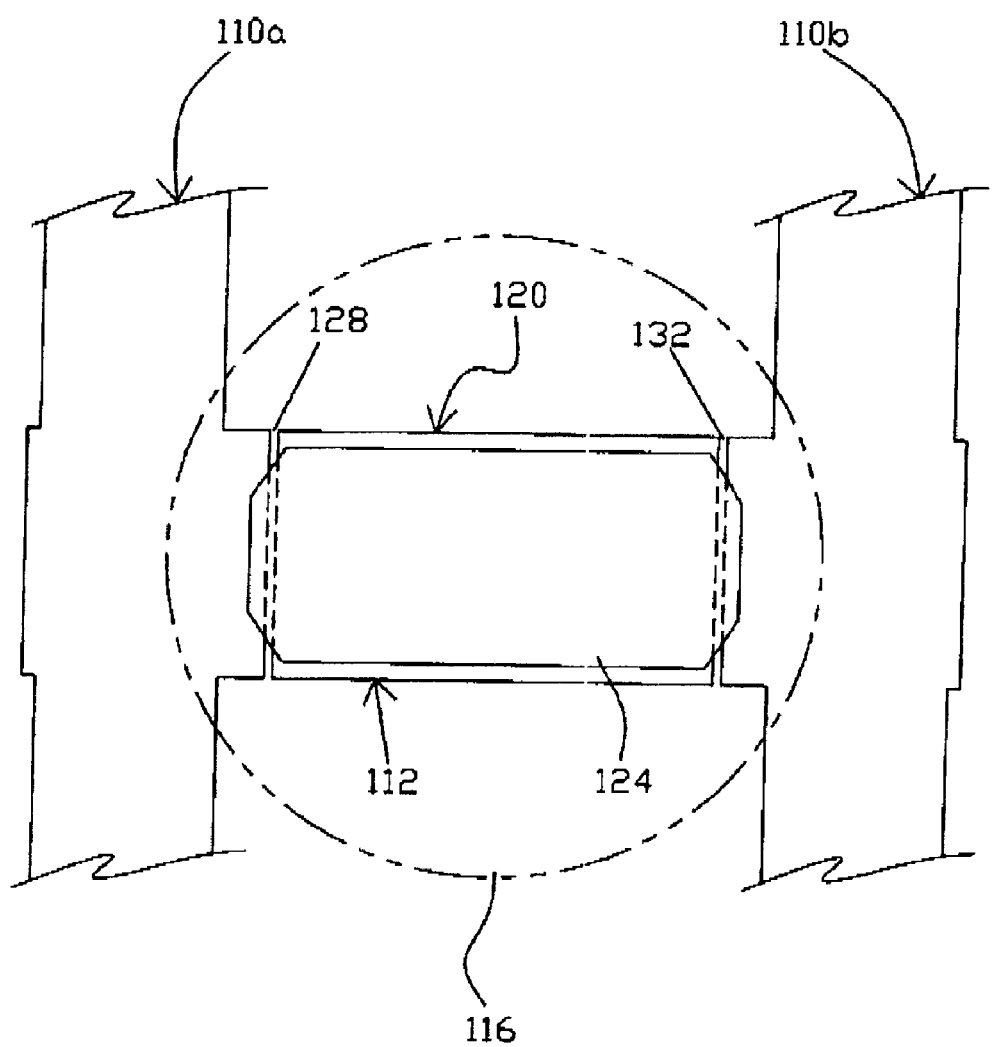
FIG. 5 is an enlarged view of a portion of the array of flexures illustrated in FIG. 4.

FIG. 5 is an enlarged view of a portion of the array of FIG. 4 showing the tab 112 and a selected region 116 to which laser energy can be applied for de-tabbing the flexures 110a and 110b. For illustration purposes, the detailed structures of the flexures 110a and 110b are omitted in FIG. 5. As shown, the tab 112 includes a stainless steel portion 120 and a dielectric portion 124. The stainless steel portion 120 includes through-slots 128, 132. The stainless steel portion 120 can be initially formed (e.g., by etching) integrally with the stainless steel layers of the flexures 110a, 110b, and the slots 128, 132 can then be formed to facilitate separation of the flexures 110a, 110b after de-tabbing. The flexures 110a, 110b can be de-tabbed by applying laser energy to the region 116 in the manner described above with respect to the flexure 10.

The laser de-tabbing methods of the present invention have numerous advantages over prior techniques for removing temporary stiffening tabs, which techniques typically involved physically removing the tabs using mechanical means. In particular, the laser de-tabbing methods of the present invention provide production flexures having substantially no residual tab material on the de-tabbed structures. Additionally, damage to the flexure structures (e.g., the flexure tongue 46) is greatly reduced as compared to prior methods, which required physical force to remove the tabs from these structures.

It is emphasized that the laser delamination methods described herein can be used to delaminate any stainless steel/dielectric and/or conductor/dielectric laminate structures in magnetic disk drive head suspensions, where the laminate structure is sufficiently transparent to the applied laser energy. Additionally, the present invention is not limited to de-tabbing disk drive head suspension flexures having dielectric tabs for temporary support during fabrication. Rather, any dielectric laminate structures can be delaminated using the methods of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for delaminating a selected region of a disk drive head suspension flexure, the selected region of the flexure form from a multilayer laminated structure including a stainless steel layer and a dielectric layer having at least one tab bonded to the stainless steel layer, the method comprising applying laser energy to the selected region of the flexure causing de-tabbing of the at least one tab of the dielectric layer from the stainless steel layer, the laser energy characterized by one or more parameters causing de-tabbing of the dielectric layer from the stainless steel layer.

2. The method of claim 1 wherein the dielectric layer is a polyimide layer.

3. The method of claim 1 wherein applying the laser energy includes applying the laser energy to an exposed surface of the dielectric layer opposite the stainless steel layer.

4. The method of claim 1 further comprising de-tabbing a flexure tongue from a flexure base region, wherein:
the flexure includes a base region and the flexure tongue of the stainless steel layer, the base region and flexure tongue separated by a gap;
the at least one tab is bonded to the base region and the flexure tongue and extending across the gap; and
applying the laser energy includes applying the laser energy causing de-tabbing of the at least one tab from the base region and flexure tongue.

5. The method of claim 1 wherein applying the laser energy further comprises applying the laser energy characterized by one or more parameters not causing visible discoloration of a surface of the stainless steel layer.

6. The method of claim 5 wherein applying the laser energy further comprises applying the laser energy characterized by one or more parameters not causing visible warping of the stainless steel layer.

7. The method of claim 1 wherein applying the laser energy includes applying the laser energy having a pulse width of from about 6 ns to about 2 ms.

8. The method of claim 1 wherein applying the laser energy includes applying the laser energy having an energy density of from about 0.57 J/cm2 to about 1.73 J/cm2.

9. The method of claim 1 wherein applying the laser energy includes applying the laser energy having a pulse width of from about 6 ns to about 2 ms and an energy density of from about 0.57 J/cm2 to about 1.73 J/cm2.

* * * * *